(12) United States Patent
Delfino et al.

(10) Patent No.: US 8,277,590 B2
(45) Date of Patent: Oct. 2, 2012

(54) METHOD AND DEVICE FOR THE MANUFACTURE OF A COMPOSITE RING

(75) Inventors: Antonio Delfino, Grolley (CH); Jean-Paul Meraldi, Zurich (CH)

(73) Assignee: Michelin Recherche et Technique S.A., Granges-Paccot (CH)

( * ) Notice: Subject to any disclaimer, the term of this patent is extended or adjusted under 35 U.S.C. 154(b) by 453 days.

(21) Appl. No.: 12/521,305

(22) PCT Filed: Dec. 13, 2007

(86) PCT No.: PCT/EP2007/010942
§ 371 (c)(1), (2), (4) Date: Mar. 4, 2010

(87) PCT Pub. No.: WO2008/080535
PCT Pub. Date: Jul. 10, 2008

(65) Prior Publication Data
US 2010/0181006 A1    Jul. 22, 2010

(30) Foreign Application Priority Data
Dec. 27, 2006  (FR) ...................................... 06 11514

(51) Int. Cl.
*B29C 53/56*   (2006.01)
*B29C 70/32*   (2006.01)

(52) U.S. Cl. ................... 156/173; 156/273.3; 156/275.5

(58) Field of Classification Search .................. 156/173, 156/175, 273.3, 275.5, 443, 446
See application file for complete search history.

(56) References Cited

U.S. PATENT DOCUMENTS

| | | | | |
|---|---|---|---|---|
| 4,233,396 A * | 11/1980 | Armstrong et al. | ............ | 430/320 |
| 5,425,829 A * | 6/1995 | Chang | ............................ | 156/175 |
| 6,640,859 B1 * | 11/2003 | Laurent et al. | ................ | 152/276 |
| 6,926,853 B2 * | 8/2005 | Hinc et al. | ..................... | 264/102 |
| 6,994,135 B2 * | 2/2006 | Delfino et al. | ................ | 152/276 |
| 7,032,634 B2 * | 4/2006 | Laurent et al. | ................... | 152/11 |
| 2003/0226630 A1 * | 12/2003 | Delfino et al. | ................ | 152/246 |
| 2006/0060280 A1 * | 3/2006 | Ladouce et al. | ............... | 152/375 |
| 2009/0022921 A1 * | 1/2009 | Meraldi et al. | ............... | 428/36.4 |

FOREIGN PATENT DOCUMENTS

| | | |
|---|---|---|
| DE | 31 09 365 | 9/1982 |
| EP | 1 174 250 | 1/2002 |

* cited by examiner

*Primary Examiner* — Michael Tolin
(74) *Attorney, Agent, or Firm* — Cozen O'Connor

(57) ABSTRACT

A process for manufacturing a composite block of closed geometry, in the form of a continuous ring, based on reinforcing fibres and on a cross-linkable resin, by continuously winding in superposition a predetermined number Nc of layers of a tape of the reinforcing fibres embedded in a matrix based on a composition comprising the cross-linkable resin, the method comprising, from the upstream end downstream, the steps of: forming a tape made of the reinforcing fibres, the thickness of the tape being between 0.1 mm and 0.5 mm; depositing the tape on a support that dictates the final shape of the composite block, and winding the tape onto the support, in a single direction, by superposing the number Nc of layers in order directly to form the continuous ring on the support, Nc being less than 15.

17 Claims, 3 Drawing Sheets

METHOD AND DEVICE FOR THE MANUFACTURE OF A COMPOSITE RING

RELATED APPLICATIONS

This is a U.S. national stage under 35 USC §371 of application No. PCT/EP2007/010942, filed on Dec. 13, 2007.

This application claims the priority of French application no. 06/11514 filed Dec. 27, 2006, the content of which is hereby incorporated by reference.

FIELD OF THE INVENTION

The present invention relates to composite materials based on fibres and on curable resin, to the composite items manufactured from such materials and to the methods and devices used for manufacturing such materials or composite items.

BACKGROUND OF THE INVENTION

Patent application EP-A-1 074 369 has described a method of manufacturing a composite part of given thickness, of convex shape, comprising reinforcing fibres parallel to at least one preferred direction of reinforcement, the said fibres being embedded in a matrix based on a composition containing a resin that can be cured by ionizing radiation, the method comprising the following steps:

arranging the said reinforcing fibres substantially parallel to a plane and impregnating them with the said composition in the liquid state;

exposing the composition containing the said fibres, in a layer of a thickness less than the said given thickness, to an ionizing radiation in order partially to polymerize the resin and obtain a precomposite in which the said composition is in the solid phase;

taking elementary sections from the solid precomposite thus obtained and applying them to a support, the surface of which is non-planar in shape, by stacking them on one another in a number dictated by the said given thickness, and causing them closely to fit the said shape of the support and thus create a stack of stressed elemental sections;

finally subjecting the stack thus obtained to final moulding, under high pressure and at high temperature, so as to continue the polymerization of the resin and thus secure the various sections of precomposite to one another.

By virtue of the method described, it is possible to obtain composite items that can be used in particular for the manufacture of non-pneumatic tires for motor vehicles.

However, one disadvantage with that method is that it is necessary, after the resin-based matrix solidifies, first of all to cut the solid precomposite into elementary sections, and then to superpose the stressed elementary sections in the desired final shape, this representing a number of successive handling operations which are detrimental from an industrial standpoint and the antithesis to the search for high manufacturing rates.

Patent application EP-A-1 174 250 for its part has proposed:

degassing the arrangement of fibres before impregnating it;

after vacuum impregnation, passing the liquid impregnate through a sizing die, of predefined cross section and predefined form, in order to impose a predetermined shape on the said impregnate, such as, for example, the shape of a thread of round cross section (see, for example, FIGS. 1 to 3) or, more specifically, the shape of a tape (FIGS. 4 to 7);

then, downstream of the die, stabilizing the said thread or tape by substantial solidification of the resin in chambers known as stabilizing chambers comprising a series of irradiation tubes (referenced, for example, 131 and 231 in FIGS. 1 and 4 respectively), emitting in the UV-visible spectrum;

and finally winding said solid (stabilized) thread or tape onto a large-diameter receiving spool (referenced, for example, 141 in FIG. 1), for intermediate storage.

Composite items can then be prepared by unwinding then rewinding the said thread or tape in solid layers onto any support of appropriate shape.

However, while the previous disadvantages of cutting and assembling prestressed sections are thus eliminated, the second method like the first demands that the resin solidification (polymerization) operation be performed over a substantial thickness of material so that the product is sufficiently "stabilized", that is to say can be handled without destroying it, for the subsequent operations of manufacturing the final composite items. This requirement in particular involves the use of stabilizing chambers of substantial length, with several irradiation tubes in series, in order to obtain sufficient treatment intensities, particularly where there is a desire to operate at high throughputs.

In the pursuit of its research, the Applicant Company has found a novel method which makes it possible to prepare a very high quality composite item, in the form of a continuous ring, by quite simply omitting the stabilizing chamber and its series of UV irradiation tubes as described in the above application EPA-1 174 250. This appreciably simplifies the manufacturing method and device, and at the same time appreciably reduces the final industrial cost of the intended composite blocks.

SUMMARY OF THE INVENTION

One object of the present invention is to provide a process for manufacturing a composite block of closed geometry, in the form of a continuous ring, based on reinforcing fibres and on a cross-linkable resin, by continuously winding in superposition a predetermined number Nc of layers of a tape of the said reinforcing fibres embedded in a matrix based on a composition comprising the said cross-linkable resin, the method comprising, from the upstream end downstream, the following steps:

producing a rectilinear arrangement of reinforcing fibres, and conveying this arrangement in a feed direction;

degassing the arrangement of fibres under the action of a vacuum;

after degassing, impregnating the arrangement of fibres with the resin composition in the liquid state;

passing the pre-preg thus obtained through a die to impose on the pre-preg the shape of a tape consisting of the reinforcing fibres in their liquid resin matrix, the thickness (denoted "Er") of the tape being between 0.1 mm and 0.5 mm;

on leaving the die, applying a surface treatment to the upper face of the tape in order to create a solid skin the thickness (denoted "Ep") of which represents less than 10% of the thickness Er of the tape, so that the skin acts as a stable base for the subsequent winding of the tape on itself;

depositing the thus superficially treated tape on a support that dictates the final shape of the composite block, and winding the tape onto the support, in a single direction, by superposing the number Nc of layers in order directly to form the continuous ring on the support, Nc being less than 15.

Unexpectedly, it has been found that such a surface treatment, over a depth Ep albeit small, was nonetheless sufficient for the order N layer (N varying from 1 to Nc−1) to act as a sufficiently stable support for the order N+1 layer immediately following it, when the tape is wound on itself as Nc superposed layers, thus preventing the reinforcing fibres from migrating from one layer N to the layers of lower rank (N−1, N−2, etc.).

Another aspect of the invention is directed to a device for manufacturing a composite block of closed geometry, in the form of a continuous ring, based on reinforcing fibres and on a cross-linkable resin, by continuously winding in superposition in several layers a tape of the reinforcing fibres embedded in a matrix based on a composition comprising the cross-linkable resin, the device comprising, from the upstream end downstream (with reference to FIGS. 1 and 2):

means for producing a rectilinear arrangement (10) of reinforcing fibres (11) and conveying (23) the arrangement (12) in a feed direction (F);

a vacuum chamber (13, 13a, 13b);

at the exit from the vacuum chamber, an impregnation chamber (14, 15, 16, 17, 18) intended to impregnate the fibres (11, 12) with the resin composition in the liquid state (17);

sizing means (19, 20) comprising at least one sizing die (20) to form a tape (21) comprising the fibres (11) and the resin (17) in the liquid state;

surface treatment means (22) capable of solidifying the upper face of the tape (21);

a support or mandrel (23) of closed shape, preferably convex, intended to receive the tape (21) to form a composite ring (30) by a one-way superposed winding of several layers of the tape.

DETAILED DESCRIPTION OF THE DRAWINGS

Figure 1:
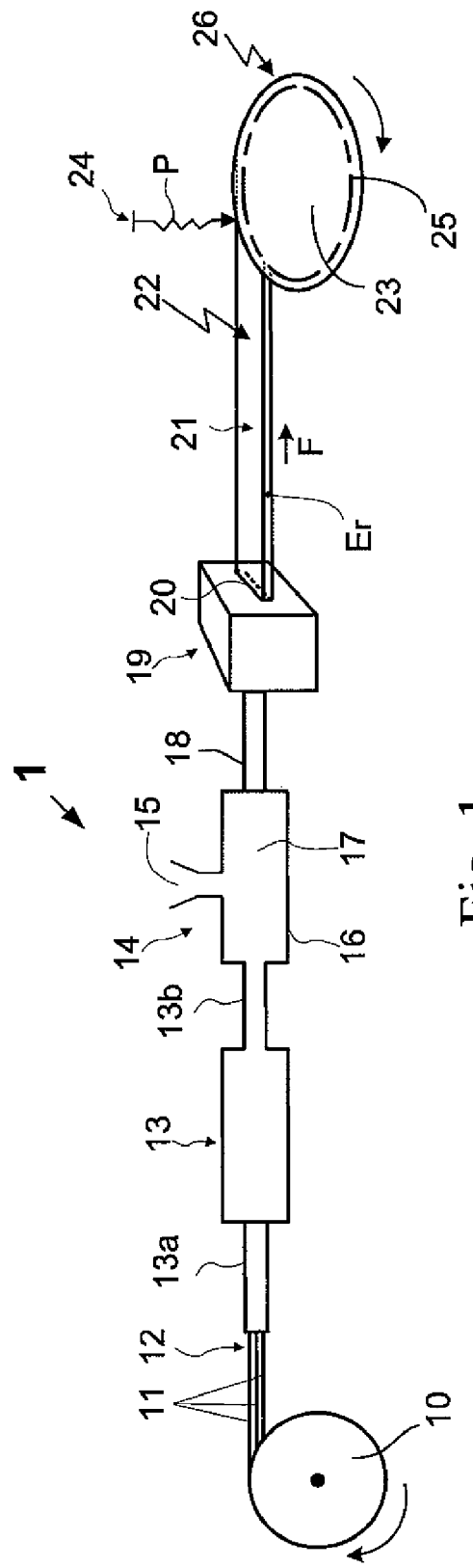
FIG. 1 shows an example of a device that can be used to implement the method of the invention.

In this description, unless expressly indicated otherwise, all the percentages (%) given are percentages by weight.

The first three steps (arrangement, degassing and impregnation) of the method of the invention are steps known to those skilled in the art, as are the materials (fibres and resin compositions) used; these have, for example, been described in one and/or other of the two aforementioned applications EP-A-1 074 369 and EP-A-1 174 250.

Any type of reinforcing fibre can be used provided that it is compatible with its cross-linkable resin matrix. A fibre such as this is, for example, chosen from the group consisting of polyacrylic, polyacrylonitrile, polyvinyl alcohol, aromatic polyamide (or "aramid"), polyamide-imide, polyimide fibres, chlorofibres, polyester, aromatic polyester, polyethylene, polypropylene fibres, cellulose, rayon, viscose, polyphenylene benzobisoxazole (or "PBO"), polyethylene naphthalate ("PEN") fibres, glass fibre, carbon fibre, silica fibre, ceramic fibres, and mixtures of such fibres. Use of high-tenacity fibres, particularly of fibres chosen from the group consisting of glass fibre, carbon fibre and mixtures of such fibres is preferred.

Before any impregnation of the fibres is undertaken, the arrangement of fibres has to be degassed by the action of vacuum, in order in particular to heighten the efficiency of impregnation and, above all, ensure that there are no bubbles inside the final composite ring. A degassing step such as this has been described in detail in the aforementioned application EP-A-1 174 250.

The resin composition used is preferably a composition of the type that can be cross-linked (or cured) by ionizing radiation, such as, for example, radiation of the UV or UV-visible type, preferably emitting in the spectrum ranging at least from 300 nm to 450 nm, an accelerated-electron or X-ray beam.

By way of cross-linkable resins, use is preferably made of a polyester resin or a vinyl ester resin. A "polyester" resin means, in the known way, a resin of the unsaturated polyester type. Vinyl ester resins for their part are well known in the field of composite materials.

Non-limitingly, the vinyl ester resin is preferably of the epoxy vinyl ester type. Use is more preferably made of a vinyl ester resin, particularly of the epoxy type, which is at least partially based on novolac (that is to say grafted onto a structure of that type) (also known as a phenoplast) and/or is a bisphenol resin, or is preferably an epoxy novolac vinyl ester resin, a bisphenol epoxy resin or is a novolac and bisphenol resin.

An epoxy novolac vinyl ester resin (the part shown between square brackets in formula I below) corresponds, for example, as is known, to the formula (I) below:

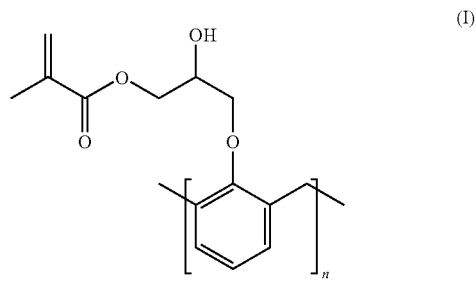

(I)

A bisphenol A epoxy vinyl ester resin (the part shown between square brackets in formula II below) corresponds, for example to the following formula (the "A" denoting that the product is manufactured using acetone):

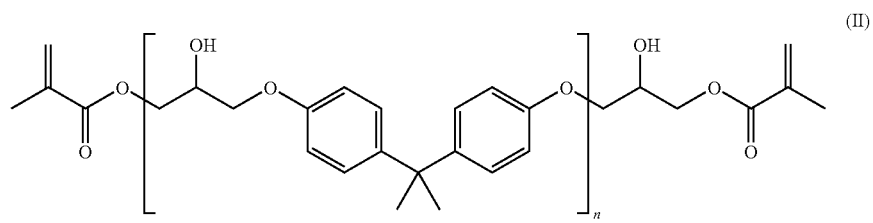

(II)

An epoxy vinyl ester resin of the novolac and bisphenol type has shown excellent results. By way of an example of such a resin mention may in particular be made of DSM's "ATLAC 590" vinyl ester resin (diluted with approximately 40% styrene) described in the aforementioned applications EP-A-1 074 369 and EP-A-1 174 250. Such epoxy vinyl ester resins are available from other manufacturers such as Reichhold, Cray Valley, UCB.

The die known as the "sizing" die makes it possible, by having a cross section of determined dimensions, generally and preferably rectangular, to adjust the proportion of resin with respect to the reinforcing fibres while at the same time imposing on the impregnate the shape and thickness required of the tape.

The method of the invention then has the essential feature of incorporating, at the exit from the sizing die and before the tape is wound in one direction on its final support, a special surface treatment which could be termed an extreme surface treatment, on the upper face of the said tape so as to create a solid skin, a very fine film, the thickness Ep of which represents less than 10%, preferably less than 5%, of the thickness Er of the tape.

Without the presence of this surface treatment, winding up on itself the composite which is still "liquid" (that is to say that, by definition, the reinforcing fibres are still in a liquid resin matrix) proves very difficult if the throughputs are to be increased. There is a risk of a parasitic "cutting" effect (also known as the "capstan effect") occurring whereby solid fibres dig through the liquid resin: the fibres then tend to move towards the instantaneous centre of curvature of the receiving mandrel and the resin tends to distance itself therefrom; this then results in a fibre and resin distribution which is not entirely uniform through the volume of the composite item, and to compacting unevennesses which may detract from the mechanical properties and endurance of the composites manufactured.

The essential thing is for the said upper face, by virtue of the solid skin thus formed, to act as a base or support that is sufficiently stable when the tape is subsequently wound on itself, without as a result having to treat the said tape more deeply and therefore more intensely. The intensity of the treatment is adjusted in such a way that the cross-linking of the resin is just enough to allow the Nc layers of tape to be wound and stacked, without giving rise to the parasitic "capstan" effect described hereinabove. However, the tape thus superficially treated over such a shallow depth Ep cannot in any way be said to be "stabilized" within the terms of the aforementioned patent application EP-A-1 174 250; in other words, thus treated, it cannot be handled without destroying it.

For all of the reasons set out hereinabove it is preferable for the thickness of the skin or film thus formed to be between 2 and 10 μm, and more preferably between 3 and 10 μm.

Solidification of the upper face of the tape may be obtained by any highly localized appropriate treatment means, preferably by a sufficient trigger for cross-linking or polymerizing the impregnation composition. By way of example, mention may be made of an ionizing treatment, particularly of the UV type, preferably in the latter instance performed in the presence of a photo-initiator in the impregnation composition.

What a "solid" skin means in the present application is, by definition, a skin the characteristic of which is that it is not soluble in an organic solvent such as acetone, at ambient temperature (23° C.). A simple test of solubility in acetone will consist in taking a specimen of thus-treated tape, directly as it leaves the treatment means 22 described later, in washing and rinsing it copiously in acetone for at least two minutes at ambient temperature (23° C.): there should then be recovered, apart from some solid reinforcing fibres, only a very fine film of cross-linked resin, of a thickness Ep representing under 10% of the thickness Er of the tape, preferably measuring between 3 and 10 μm thick, and corresponding to the upper part of the tape that has undergone the solidification or cross-linking treatment.

It is desirable for the duration of this surface treatment, performed continuously on the tape as it progresses, to be as short as possible, preferably lasting less than 10 seconds, typically lasting of the order of a few tenths of a second at most. It is because of this that the treatment could be said to be of the "flash" type.

In the case of a UV flash for example, it will be readily understood that the duration of the treatment will be directly dependent on numerous variations including, in particular, the nature of the resin, the amount of photo-initiator, the power, wavelength and separation of the UV image and source. A person skilled in the art will be readily able to adapt and control his particular treatment conditions in order to implement the method of the invention, if necessary by carrying out a number of successive setup trials. It is preferable for the duration of the treatment (the time of exposure to the UV source in particular) to be less than 5 s, and more preferably still, less than 2 s.

The tape of fibres thus treated at the "extreme surface" then arrives continuously on a support or mandrel of appropriate shape onto which it is then directly wound, in one direction, in a superposition of the predetermined number Nc of layers. This then forms a continuous and closed ring the cross section of which is essentially rectangular.

According to a preferred embodiment, the tensile stress experienced by the reinforcing fibres in the tape as it progresses (that is to say by the impregnated fibres) ranges between 0.2 and 5 cN/tex (centinewtons per tex); this then is the tension measured between the sizing die and the entry to the support or mandrel that dictates the shape of the final composite block. It has been found that outside of this preferred tension range, there was a risk of deformation or at the very least of a loss of uniformity of shape of the tape that could prove detrimental to the quality and endurance of the final composite block. For this reason, the said tensile stress is more preferably between 0.5 and 2.5 cN/tex.

The operation of winding the tape onto the said mandrel is preferably performed by rotating the mandrel on itself in a plane that is fixed and tangential to the plane in which the tape arrives on the rotary mandrel. The winding operation is halted once the Nc layers of tape have been wound onto themselves.

One appreciable advantage of the method of the invention and of its surface treatment is that the tape is still sticky enough to allow the order N layer to stick to the previous layer (N−1) without any need to apply any additional mechanical and/or thermal action.

However, according to one possible alternative form, each order N layer may be mechanically pressed as it enters the support or mandrel, for example by rollering using a roller having the same width as the tape, so as to compact the assembly slightly, guarantee excellent adhesion between the successive layers and distribute the fibres uniformly in the lateral direction.

This stages yields a composite block in the form of a continuous flat ring, the reinforcing fibres of which are substantially unidirectional, distributed uniformly throughout the volume of the matrix (resin composition).

The special geometry of the ring thus formed, which is preferably convex (for example circular, oval, elliptical), is of course dictated by that of the support or mandrel onto which the tape has been wound. According to one preferable alternative form of embodiment, the support or mandrel, for example made of metal, is provided with a receiving groove espousing the shape of the tape, of an appropriate depth to receive and geometrically stabilize the Nc superposed layers of tape.

Once the composite ring has thus been formed, the resin is preferably subjected to sufficient polymerization (for example using UV) that the said ring is sufficiently stabilized, this time throughout its thickness, before it is separated from its support. To facilitate this separation, the said support or mandrel is advantageously built in two removable, symmetrical or otherwise, parts which can easily be mechanically separated.

The composite block thus stabilized, in which the resin composition is then essentially in the solid phase, can then easily be handled without the risk of becoming destroyed, can be stored as it is or immediately treated to complete the polymerization of the resin if need be (final curing or cross-linking).

The final curing operation may be performed by any means known to those skilled in the art, under simple atmospheric pressure, that is to say "ex-mould" (or "open mould" according to recognized terminology), for example in a UV chamber or a simple oven, or alternatively under high pressure (typically several bar to several tens of bar) at the appropriate temperature. One possible alternative form of embodiment is to completely bake the composite block on its receiving support or mandrel and not remove the latter until after baking is complete.

The thickness of the final composite ring preferably ranges between 0.5 and 5.0 mm (millimetres), and more preferably ranges from 1 to 2 mm. Its width is preferably less than 25 mm, and more preferably still lies in a range from 5 to 20 mm.

As for the dimensions of the ring itself (i.e. substantially that of the mandrel or support used to produce it), its largest dimension (for example its diameter, if the ring is of circular geometry) is typically of the order of a few cm (centimetres) to a few tens of cm.

Two other essential features of the method of the invention are, firstly, the maximum thickness of the tape leaving the sizing die, which has to be less than 0.5 mm, and secondly the maximum number of layers which are wound to form the composite ring, which has to be less than 15. It has been found that, if these two features are not satisfied, the shape and evenness of the tape and those of the final composite will no longer be under control, leading to prohibitively degrading bending/compression endurance of the final composite ring. What is more, a thickness less than 0.1 mm (namely 100 μm) is not compatible with industrial production constraints.

For all the reasons mentioned hereinabove, the thickness of the tape leaving the die is preferably chosen between 0.10 and 0.35 mm, more preferably ranging between 0.15 and 0.30 mm; the number Nc of layers for its part is preferably less than 10, and more preferably lies between 5 and 10.

A person skilled in the art would expect air bubbles inevitably to form at the surface of the tape, at the exit from the sizing die, because of the raised pressure imposed (end of the vacuum zone), and would expect these bubbles then easily to become trapped between the layers of tape because of the winding technique adopted here, in this instance a one-way winding as a superposition of layers (without reeling, fibres not crossing), especially since there is no appreciable tension on the fibres. A parasitic effect such as this would naturally detract from the quality, appearance and endurance of the final composite.

Unexpectedly, this does not prove to be the case, provided that all these combined technical features of the method of the invention are met, particularly the two essential conditions listed hereinabove relating to the thickness of the elementary tape and to the number of superposed layers.

The method of the invention can be implemented using a device which is itself a subject of the invention.

The attached FIG. 1 provides a very simple schematic illustration of one example of such a device 1, for a part (after exiting the die 20) depicted in perspective in order to illustrate the origins of the tape 21 after passing through the sizing means 19, 20.

That figure shows a spool 10 containing, in the example illustrated, glass fibre 11. The spool is paid out continuously by drive, so as to produce a rectilinear arrangement 12 of these fibres 11. In general, the reinforcing fibres come as "rovings", that is to say already in groups of fibres wound in parallel onto a spool (for example, use is made of the fibres marketed by Owens Corning under the name "Advantex" fibre, with a yarn count of 1200 tex (remember that 1 tex=1 g/1000 m of fibre)). It is, for example, the tension applied by the rotary receiver 23 that will allow the parallel fibres and the tape to progress through the plant 1.

This arrangement 12 then passes through a vacuum chamber 13 (connected to a vacuum pump that has not been depicted), positioned between an inlet nozzle 13a and an outlet nozzle 13b opening onto the impregnation chamber 14, the two, preferably rigid-walled, nozzles having, for example, a minimum cross section greater than (typically twice the size of) the total cross section of fibres and a length very much greater than (typically 50 times as great as) the said minimum cross section.

As already taught by the aforementioned application EP-A-1 174 250, the use of rigid-walled nozzles both for the inlet nozzle to the vacuum chamber and for the outlet nozzle from the vacuum chamber, and the transfer from the vacuum chamber to the impregnation chamber proves compatible both with high throughputs of fibres through the orifices without breaking the fibres, and also allows sufficient sealing to be achieved. All that is required, if need be experimentally, is to find the largest passage cross section, given the total cross section of fibres to be treated, that will still allow sufficient sealing to be achieved, given the rate of progress of the fibres and the length of the nozzles. Typically, the vacuum inside the chamber 13 is, for example, of the order of 0.1 bar.

On exiting the vacuum chamber 13, the arrangement 12 of fibres 11 passes through an impregnation chamber 14 comprising a feed tank 15 (connected to a metering pump, not depicted) and a sealed impregnation tank 16 completely full of impregnation composition 17 based on a curable resin of the vinyl ester type (e.g. DSM's "ATLAC 590"). By way of example, the composition further comprises (in a weight percentage of 1 to 2%) a photo-initiator suitable for UV and/or UV-visible radiation with which the composition will subsequently be treated, for example (2,4,6-trimethylbenzoyl) phenylphosphine oxide (Ciba's "Irgacure 819"). Of course, the impregnation composition 17 is in the liquid state. There emerges from the impregnation chamber 14, in a sealed outlet nozzle 18 (still under vacuum), an impregnate which, for example, contains 50 to 75% (wt %) of solid fibres 11, the remainder consisting of the liquid impregnation matrix 17.

The impregnate then passes through sizing means 19 comprising at least one sizing die 20 of which the passage (not depicted here) is, for example of rectangular or conical shape, is suited to the specific embodiment conditions. By way of example, this passage has a minimal cross section of rectangular shape the downstream orifice of which has dimensions (for example 5.3 mm×0.25 mm or 10.6 mm×0.25 mm) slightly greater than that of the intended tape. The said die has a length which is typically at least 100 times the minimum dimension of the said minimum cross section. Its purpose is to give the finished product good dimensional accuracy, and may also serve to dose the fibre content with respect to the resin. According to one possible alternative form of embodiment, the die 20 can be directly incorporated into the impregnation chamber 14, thus for example avoiding the need to use the outlet nozzle 18.

The sizing means (19, 20) make it possible at this stage to obtain a "liquid" composite tape 21 (liquid in the sense that its impregnation resin is still liquid over more than 90% of its thickness Er), the shape of the cross section of which is essentially rectangular (for example 5 mm×0.2 mm or 10 mm×0.2 mm, respectively). This tape 21 of thickness Er is driven in the direction of the arrow F.

Before the liquid tape 21 is wound onto its final receiving support 23, a surface treatment of the flash type (that is to say of very brief duration lasting for example of the order of 1 second) is performed using treatment means 22 intended to create, on the upper face of the said tape, a solid skin the thickness Ep of which represents less than 10% of the thickness Er of the tape (namely under 20 μm in this example); the means 22 for example consist of a UV lamp unit (the "UVA print" lamp by Dr. Hönle, with a wavelength of 200 to 600 nm).

Between the calibration means (19, 20) and the final receiving support (23) it is preferable to keep the tension applied to the fibres at a modest level of, for example, between 0.5 and 2.5 cN/tex; to control that, these tensions may for example be measured directly at the exit from the die, using appropriate tension meters well known to those skilled in the art.

The tape 21 thus treated then arrives on its final receiving support 23, for example a rotary mandrel of convex shape (here oval by way of example), at the entry to which it may, according to one advantageous embodiment, be pressed mechanically using means 24 (for example by mechanical rollering using a roller) applying a slight pressure P to the upper face of the tape 21. The rotary mandrel 23 is preferably provided with a receiving groove 25 espousing the shape and width of the tape 21 and thus making it easy for the tape to be wound onto itself in its Nc various superposed layers.

Figure 2:
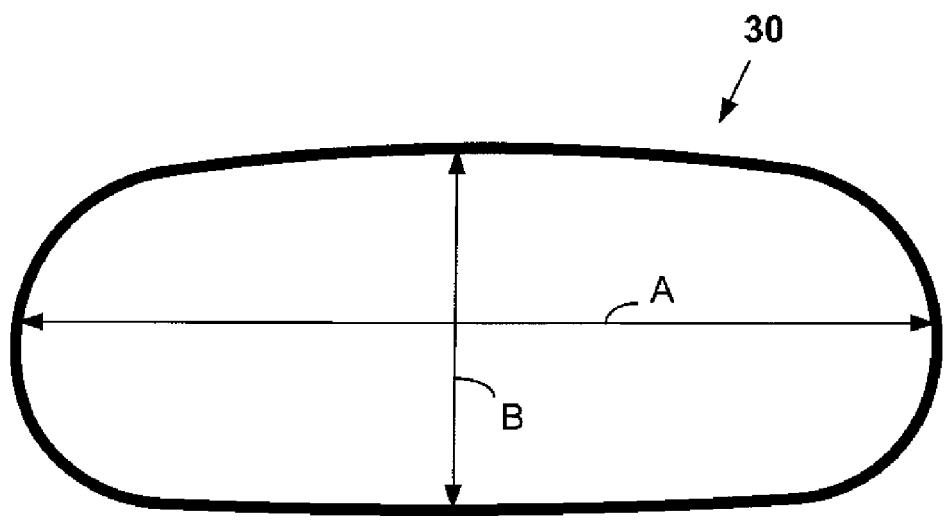
FIG. 2 shows a composite block (continuous elementary ring) obtained according to an embodiment of the method of the invention.

Once the Nc layers of tape have been wound onto the support or mandrel 23, winding is halted, in order to obtain the intended final composite block (referenced 30 in FIG. 2).

Facing the mandrel 23 there may possibly be positioned stabilizing means (26) able, for example, to polymerize the resin of the said composite ring on the said support or mandrel (23). The tape thus stabilized can be handled easily; it is for example treated for 5 min in a UV oven prior to final curing, for example in a low-pressure and low-temperature oven (for example at 230° C. for 5 to 6 min at 10 bar). According to another alternative form of embodiment, the entire curing operation may be performed under UV radiation, entirely or otherwise on the receiving mandrel.

This ultimately yields a composite block in the form of a closed continuous ring, the reinforcing fibres of which are distributed uniformly throughout the volume. This composite block has excellent mechanical properties and, in particular, very high endurance in bending and in shear.

An example of such a composite block 30 has been depicted schematically in the attached FIG. 2; it was obtained by winding onto a convex mandrel of elliptical shape. It consists of a closed flat continuous ring 30 the rectangular cross section of which has the dimensions 10 mm×1.4 mm. As can be seen in FIG. 2, the shape or geometry of the ring is essentially elliptical with longitudinal inside dimensions (denoted A in FIG. 2) of the order of 15 cm and transverse interior dimensions (denoted B in FIG. 2) of the order of 6 cm. A composite ring or block such as this was prepared by winding 7 (Nc=7) successive layers of tape in accordance with the method of the invention described hereinabove, using a device like the one depicted schematically in FIG. 1.

The invention thus offers the possibility of manufacturing a composite block in very small sections which may have a great many industrial applications, whether used individually or combined with other composite blocks to form more complex structures. Such structures may in particular serve as reinforcing structures for any motor vehicle ground contact system such as non-pneumatic tires, pneumatic tires, internal safety supports for tires, wheels, other suspension and anti-vibration elements.

By way of example, by adapting the number "Na" (Na preferably smaller than 10, for example in a range from 3 to 7) and the dimensions of these elementary rings, these elementary rings can advantageously be nested one inside the other then mechanically or "chemically" fastened together using, for example, a filling polymer intended to fill all the gaps present between the elementary rings. This filling polymer will of course have to be compatible with the resin of the composite ring and capable of adhering firmly thereto, if necessary by means of an appropriate adhesive composition like the one described, for example, in application WO 2004/058909. This polymer is, for example, a diene elastomer or a polyurethane.

Figure 3:
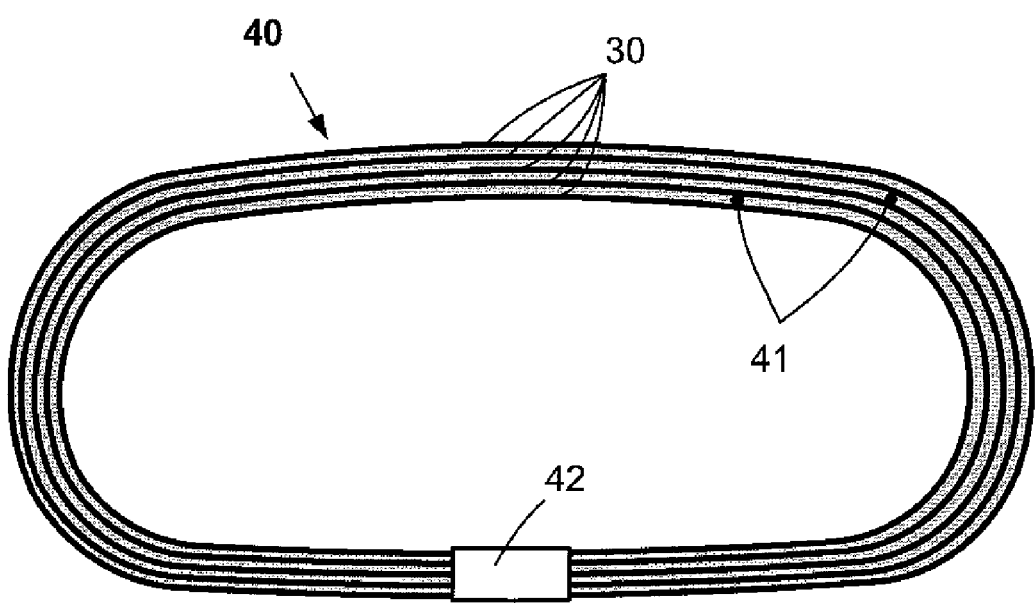
FIG. 3 shows one embodiment of an assembly of several composite blocks.

FIG. 3 schematically depicts an example of such a composite reinforcing structure 40 formed of 5 (Na=5) elementary rings 30 which are "chemically" secured through the use of a filling polymer 41 (for example made of polyurethane or of diene rubber) that fills the gaps present between the 5 elementary rings 30. The reinforcement 40 may comprise mechanical connection means 42 (for example a fastener) intended to provide subsequent connection with the rigid part of a wheel as explained hereinafter.

This composite reinforcing structure may form a radial reinforcing hoop of a carcass of a non-pneumatic tire like the one described, for example, in patent applications WO-A-00/37269 and EP-A-1 359 028.

Figure 4:
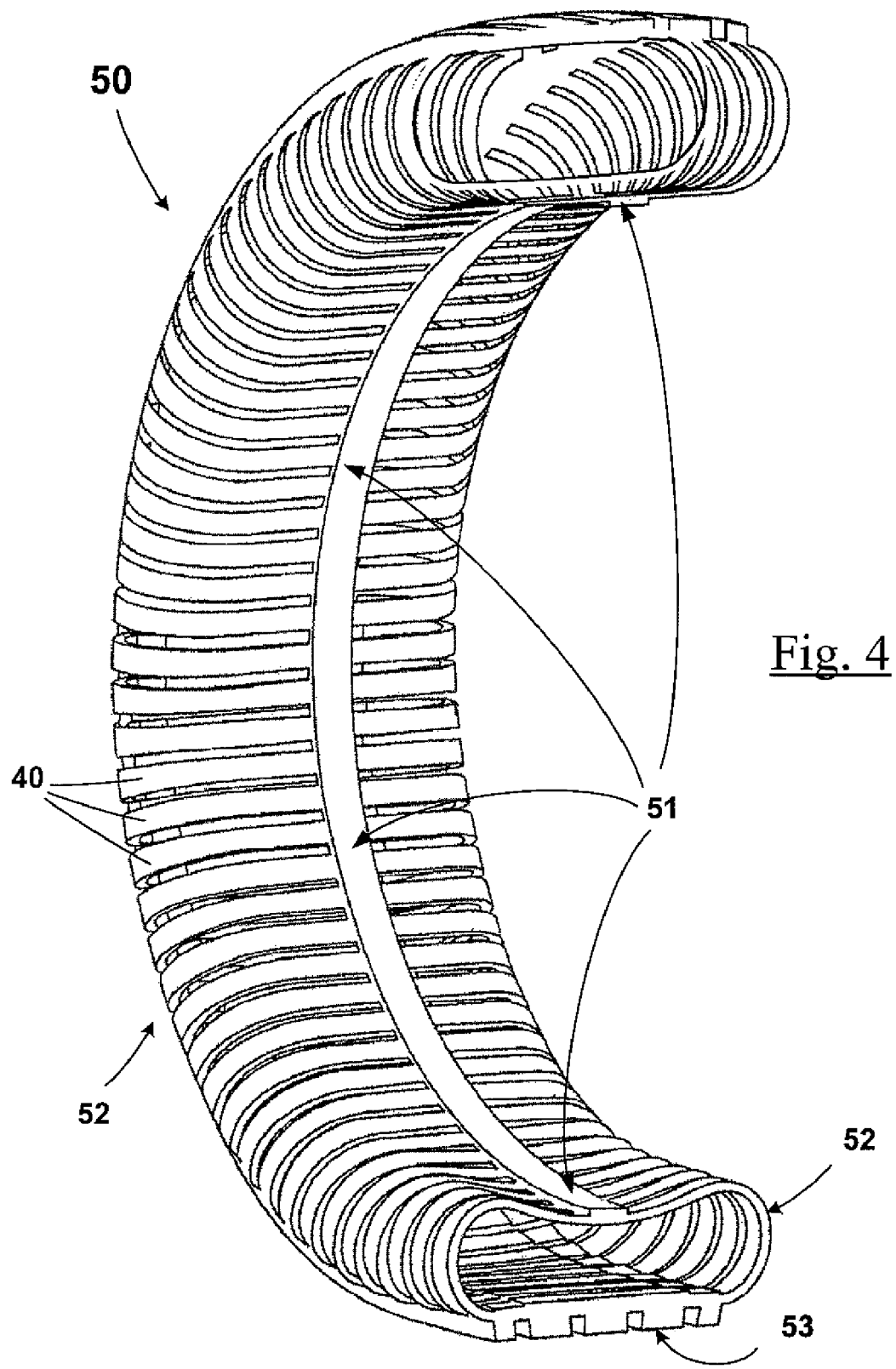
FIG. 4 shows a reinforcing structure for a non-pneumatic elastic tire.

The appended FIG. 4 shows a partial perspective view of a flexible non-pneumatic tire 50 such as this. A tire such as this, when associated with any other rigid mechanical element intended to provide the connection between the flexible tire and the hub, replaces the assembly consisting of the pneumatic tire and the wheel as found on most current road vehicles.

The profile of the tire delimits a toric internal cavity of ovoid cross section. The tire 50 comprises a fixing zone 51 (comprising the connecting means 42 illustrated in FIG. 3), two side walls 52 and a tread 53. The fixing zone is intended to be rigidly connected to a wheel hub via a mechanical element such as a wheel disc or wheel centre (not depicted here). In this FIG. 4, the tread 53 comprises several circumferential ribs, but this aspect is of course entirely non-limiting. The side walls 52 are rounded and occupy most of the radial height of the tire 50. The bearing structure comprises a plurality of support elements consisting of the composite reinforcing structures 40 illustrated in the previous FIG. 3.

The support elements 40 are circumferentially adjacent and each extends substantially radially outwards from the fixing region 51. FIG. 4 also shows a principle of this type of non-pneumatic tire, whereby it is the bending of the support element that takes the load. In this particular example, the tire comprises about 100 support elements 40. This number may of course be very different according, for example, to the type of vehicle and to the use for which it is intended, and depending on the characteristics of the support elements. The number of elements may thus vary for example from 30 to 300. As a preference, an interconnecting structure positioned radially under the tread 53, which is relatively rigid in longitudinal tension-compression, circumferentially connects all the support elements 40.

For further details regarding the construction of these support elements and the interconnecting structure, the reader will find the aforementioned patent applications WO-A-00/37269 and EP-A-1 359 028 instructive.

A non-pneumatic tire such as this can be fitted to any type of motor vehicle, for example of the passenger car type, two-wheeled type (particularly motorcycles and scooters), to aeroplanes and to industrial vehicles chosen from vans, "heavy vehicles"—that is to say underground trains, buses, road haulage vehicles (lorries, tractors, trailers), off-road vehicles such as agricultural vehicles or construction plant—and other transport or handling vehicles.

In conclusion, by virtue of the method of the invention, it is now possible to obtain a very high quality composite ring simply by one-way winding of layers of resin in the essentially liquid state, and to do so at low cost, particularly avoiding the use of long stabilizing chambers and their series of irradiation tubes.

The invention claimed is:

1. A process for manufacturing a composite block of closed geometry, in the form of a continuous ring, based on reinforcing fibres and as a cross-linkable resin, by continuously winding in superposition a predetermined number Nc of layers of a tape of the reinforcing fibres embedded in a matrix based on a composition comprising the cross-linkable resin, the process comprising, from the upstream end downstream, the steps of:

producing a rectilinear arrangement of reinforcing fibres, and conveying this arrangement in a feed direction;

degassing the arrangement of fibres under the action of a vacuum;

after degassing, impregnating said arrangement of fibres with the resin composition in the liquid state;

passing the pre-preg thus obtained through a die to impose on said pre-preg the shape of a tape consisting of the reinforcing fibres in their liquid resin matrix, the thickness (denoted "Er") of said tape being between 0.1 mm and 0.5 mm;

on leaving the die, applying a surface treatment to the upper face of said tape in order to create a solid skin the thickness (denoted "Ep") of which represents less than 10% of the thickness Er of the tape, so that said skin acts as a base for the subsequent winding of the tape on itself; and depositing the thus superficially treated tape on a support that dictates the final shape of the composite block, and winding said tape onto said support, in a single direction, by superposing the number Nc of layers in order directly to form the continuous ring on the support, Nc being less than 15.

2. The process according to claim 1, wherein the reinforcing fibres are chosen from the group consisting of glass fibre, carbon fibre, and mixtures of such fibres.

3. The process according to claim 1, wherein the resin of the composition is a resin that can be cross-linked by ionizing radiation.

4. The process according to claim 1, the resin being a polyester resin or a vinyl ester resin.

5. The process according to claim 4, the vinyl ester resin being an epoxy novolac vinyl ester resin and/or a bisphenol epoxy resin.

6. The process according to claim 1, the skin thickness Ep representing less than 5% of the thickness Er of the tape.

7. The process according to claim 1, the thickness Er of the tape being between 0.10 and 0.35 mm.

8. The process according to claim 1, the thickness Ep of the skin being between 2 and 10 μm.

9. The process according to claim 1, the surface treatment consisting in a treatment to cross-link the resin.

10. The process according to claim 9, the cross-linking treatment consisting of an ionizing treatment.

11. The process according to claim 10, the ionizing treatment consisting of a UV treatment.

12. The process according to claim 1, Nc being less than 10.

13. The process according to claim 12, Nc being between 5 and 10.

14. The process according to claim 1, the thickness of said ring being between 0.5 and 5.0 mm.

15. The process according to claim 14, the thickness of said ring being in a range from 1 to 2 mm.

16. The process according to claim 1, the width of said ring being less than 25 mm.

17. The process according to claim 16, the width of said ring being in a range from 5 to 20 mm.

* * * * *